United States Patent
Ishikawa (10) Patent No.: US 11,006,465 B2
(45) Date of Patent: May 11, 2021

(54) COMMUNICATION APPARATUS, PERIPHERAL APPARATUS, AND COMMUNICATION SYSTEM

(71) Applicant: TOSHIBA TEC KABUSHIKI KAISHA, Tokyo (JP)

(72) Inventor: Hiroyuki Ishikawa, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 48 days.

(21) Appl. No.: 16/445,493

(22) Filed: Jun. 19, 2019

(65) Prior Publication Data
US 2020/0059974 A1 Feb. 20, 2020

(30) Foreign Application Priority Data
Aug. 14, 2018 (JP) .............................. JP2018-152684

(51) Int. Cl.
*H04W 76/10* (2018.01)
*H04W 72/04* (2009.01)

(52) U.S. Cl.
CPC ........... *H04W 76/10* (2018.02); *H04W 72/04* (2013.01)

(58) Field of Classification Search
CPC .............................. H04W 76/10; H04W 72/04
See application file for complete search history.

(56) References Cited

U.S. PATENT DOCUMENTS

| 7,702,775 | B2* | 4/2010 | Kuan ...................... H04L 63/08 709/224 |
| 2007/0230423 | A1* | 10/2007 | Yoshida ................ H04W 76/10 370/338 |
| 2011/0313871 | A1* | 12/2011 | Greenwood ........... G06Q 20/10 705/16 |
| 2012/0142285 | A1 | 6/2012 | Tsuchida et al. |

(Continued)

FOREIGN PATENT DOCUMENTS

JP 08-124035 5/1996

OTHER PUBLICATIONS

Extended European Search Report for European Patent Application No. 19189741.2 dated Jan. 3, 2020.

(Continued)

*Primary Examiner* — Duc C Ho
(74) *Attorney, Agent, or Firm* — Amin, Turocy & Watson, LLP (57) ABSTRACT

According to one embodiment, a communication apparatus includes a transmitting section, a receiving section, a confirming section, and a communication section. The transmitting section performs broadcast transmission of a command in a plurality of different channels. The receiving section receives various kinds of information necessary for establishment of wireless connection, the various kinds of information being transmitted by a peripheral apparatus that receives the command. The confirming section confirms, based on the reception of the various kinds of information by the receiving section, in which of the channels the communication apparatus is capable of communicating with the peripheral apparatus. The communication section establishes the wireless connection to the peripheral apparatus using the channel confirmed by the confirming section.

20 Claims, 7 Drawing Sheets

(56) References Cited

U.S. PATENT DOCUMENTS

| | | | |
|---|---|---|---|
| 2013/0031275 A1* | 1/2013 | Hanes | H04W 76/10 710/4 |
| 2016/0062933 A1 | 3/2016 | Kanomata | |
| 2018/0005227 A1* | 1/2018 | Sandelov | G07F 7/0853 |
| 2018/0211238 A1 | 7/2018 | Ishikawa et al. | |

OTHER PUBLICATIONS

Cervello, et al. "Dynamic Channel SDelection (DCS) Scheme for 802.11", IEEE 802.11-00/195, Jul. 12, 2000, pp. 1-7.

Choi, et al. "Transmitter Power Control (TPC) and Dynamic Frequency Selection (DFS) Joint Proposal for 802.11h WLAN", IEEE 802.11-01/169, Mar. 12, 2011, pp. 1-16.

Elsts, et al. "Adaptive channel selection in IEEE 802.15A TSCH networks", 2017 Global Internet of Things Summit (GIOTS), IEEE, Jun. 6, 2017, pp. 1-6.

\* cited by examiner

COMMUNICATION APPARATUS, PERIPHERAL APPARATUS, AND COMMUNICATION SYSTEM

CROSS-REFERENCE TO RELATED APPLICATION

This application is based upon and claims the benefit of priority from Japanese Patent Application No. 2018-152684, filed in Aug. 14, 2018, the entire contents of which are incorporated herein by reference.

FIELD

Embodiments described herein relate generally to a communication apparatus, a peripheral apparatus, and a communication system.

BACKGROUND

There is known a communication apparatus wirelessly connected to a peripheral apparatus to perform communication. In such a communication apparatus, in order to communicate with the peripheral apparatus, a wireless channel (a frequency) set as a transmission destination needs to be the same as a wireless channel used by the peripheral apparatus.

Such a communication apparatus cannot be wirelessly connected to the peripheral apparatus if the wireless channel used by the peripheral apparatus is unknown.

DETAILED DESCRIPTION

An object of embodiments is to provide a communication apparatus, a peripheral apparatus, and a communication system that can wirelessly connect the peripheral apparatus, a channel in use of which is unknown, and the communication apparatus.

In general, according to one embodiment, a communication apparatus includes a transmitting section, a receiving section, a confirming section, and a communication section. The transmitting section performs broadcast transmission of a command in a plurality of different channels. The receiving section receives various kinds of information necessary for establishment of wireless connection, the various kinds of information being transmitted by a peripheral apparatus that receives the command. The confirming section confirms, based on the reception of the various kinds of information by the receiving section, in which of the channels the communication apparatus is capable of communicating with the peripheral apparatus. The communication section establishes the wireless connection to the peripheral apparatus using the channel confirmed by the confirming section.

A communication system according to an embodiment is explained below with reference to the drawings. In the drawings used for the following explanation of the embodiment, components are simplified and illustrated for explanation. In the following explanation, an example is explained in which a POS (point of sale) terminal is used as an example of a communication apparatus.

Figure 1:
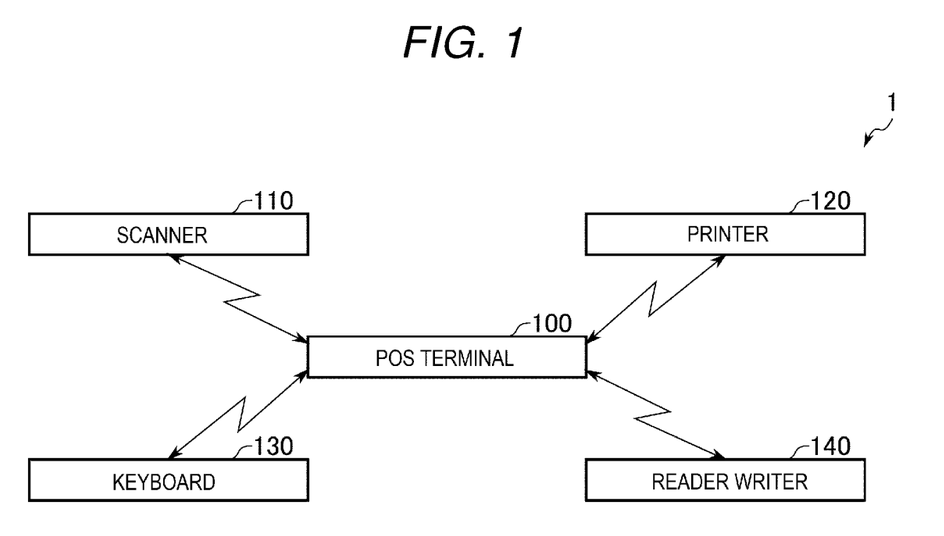
FIG. 1 is a block diagram illustrating an overview of an example of a communication system according to an embodiment.

FIG. 1 is a block diagram illustrating an overview of an example of a communication system 1 according to the embodiment. The communication system 1 is a system that performs communication between a communication apparatus and peripheral apparatuses (peripheral devices). As illustrated in FIG. 1, as an example, the communication system 1 includes a POS terminal 100, a scanner 110, a printer 120, a keyboard 130, and a reader writer 140. The POS terminal 100 is an example of the communication apparatus. The scanner 110, the printer 120, the keyboard 130, and the reader writer 140 are the peripheral apparatuses of the POS terminal 100.

Figure 2:
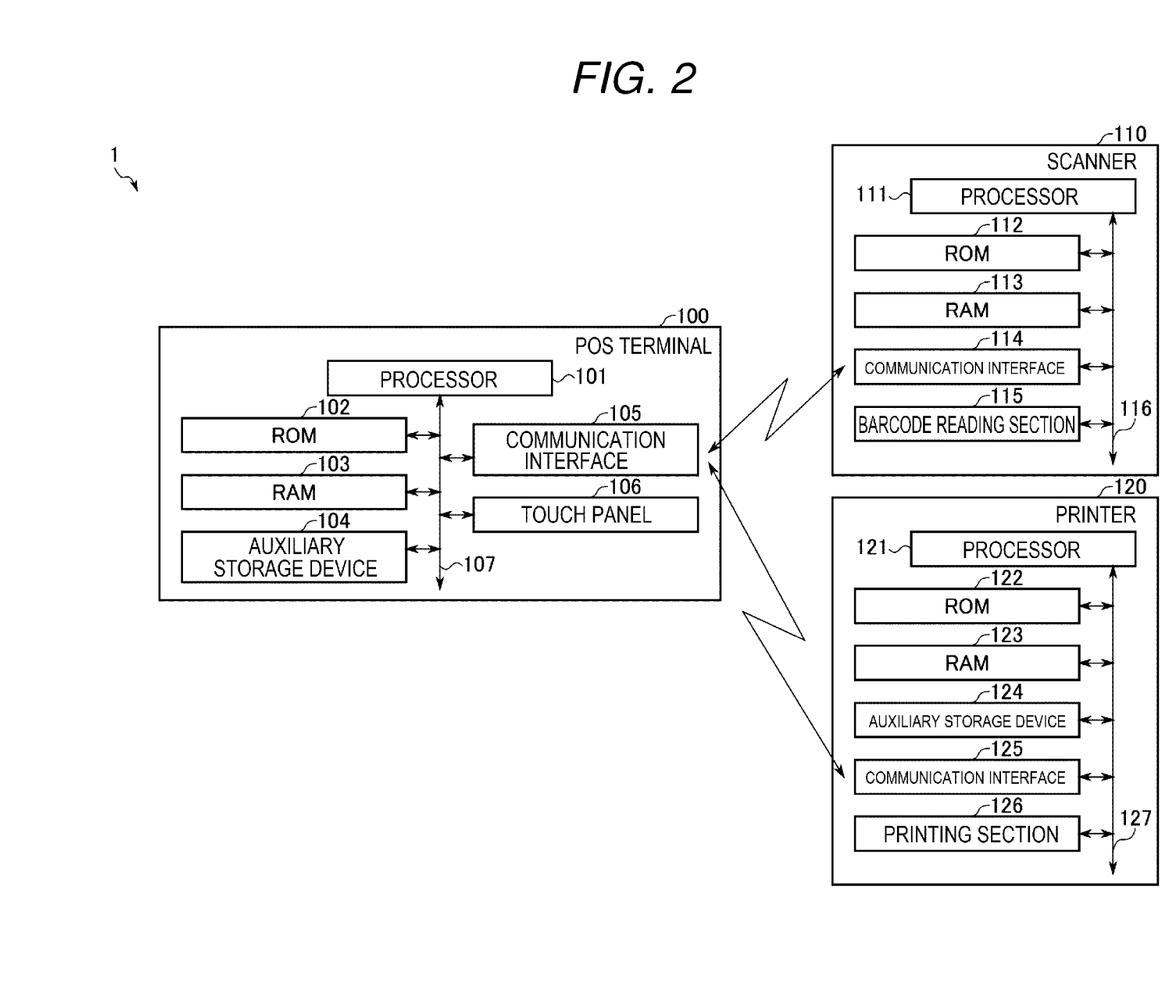
FIG. 2 is a block diagram illustrating an example of a main part circuit configuration of the communication system and components included in the communication system.
Figure 3:
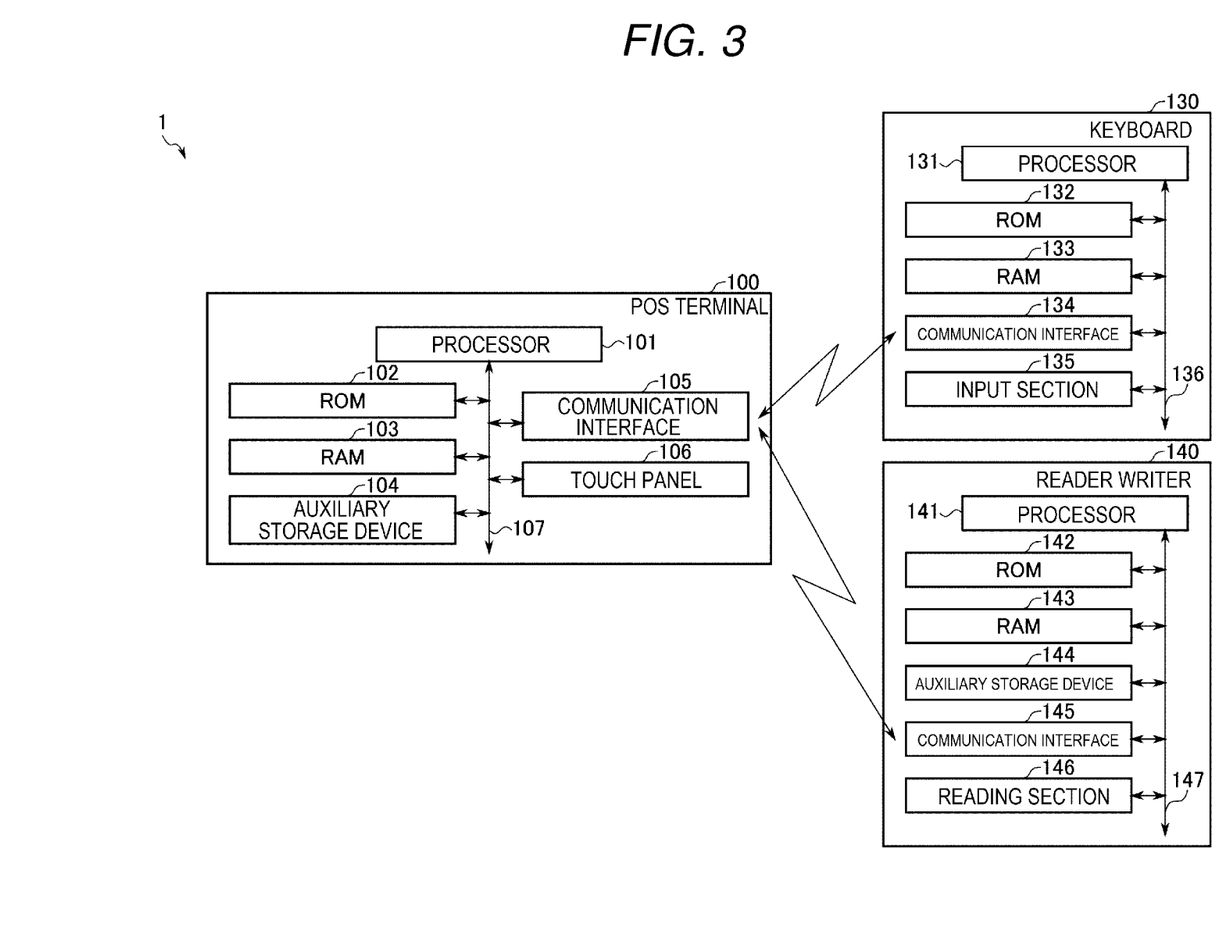
FIG. 3 is a block diagram illustrating an example of a main part circuit configuration of the communication system and components included in the communication system.

The communication system 1 is further explained with reference to FIGS. 2 and 3. FIGS. 2 and 3 are block diagrams illustrating examples of main part circuit configurations of the communication system 1 according to the embodiment and components included in the communication system 1.

The POS terminal 100 is set in a store such as a retail store for, for example, register jobs such as registration of settlement target commodities and settlement concerning the registered commodities. The POS terminal 100 is typically a terminal included in a POS system. However, the POS terminal 100 may be an electronic cash register or the like not included in the POS system. The POS terminal 100 may be a terminal of a self-type or a semi-self-type. As an example, the POS terminal 100 includes a processor 101, a ROM (read-only memory) 102, a RAM (random-access memory) 103, an auxiliary storage device 104, a communication interface 105, and a touch panel 106. These sections are connected by a bus 107 or the like.

The processor 101 is equivalent to a central part of a computer that performs processing such as an arithmetic operation and control necessary for the operation of the POS terminal 100. The processor 101 controls the sections based on computer programs such as system software, application software, or firmware stored in the ROM 102, the auxiliary storage device 104, or the like in order to realize various functions of the POS terminal 100. Apart or all of the computer programs may be incorporated in a circuit of the processor 101. The processor 101 is, for example, a CPU (central processing unit), an MPU (micro processing unit), an SoC (system on a chip), a DSP (digital signal processor), a GPU (graphics processing unit), an ASIC (application specific integrated circuit), a PLD (programmable logic device), or an FPGA (field-programmable gate array). Alternatively, the processor 101 is a combination of a plurality of devices among these devices.

The ROM 102 is equivalent to a main storage device of the computer including the processor 101 as the central part.

The ROM 102 is a nonvolatile memory exclusively used for readout of data. The ROM 102 stores the computer programs explained above. The ROM 102 stores data, various setting values, or the like used by the processor 101 in performing various kinds of processing.

The RAM 103 is equivalent to the main storage device of the computer including the processor 101 as the central part. The RAM 103 is a memory used for reading and writing of data. The RAM 103 is used as a so-called work area or the like in which data temporarily used by the processor 101 in performing the various kinds of processing is stored.

The auxiliary storage device 104 is equivalent to an auxiliary storage device of the computer including the processor 101 as the central part. The auxiliary storage device 104 is, for example, an EEPROM (electric erasable programmable read-only memory), an HDD (hard disk drive), an SSD (solid state drive), or an eMMC (embedded Multi Media Card). The auxiliary storage device 104 sometimes stores the computer programs explained above. The auxiliary storage device 104 saves data used by the processor 101 in performing the various kinds of processing, data generated by the processing in the processor 101, various setting values, or the like.

The auxiliary storage device 104 stores a list of transmission rates usable by the POS terminal 100.

The auxiliary storage device 104 stores CH_min and CH_max. The CH_min is a minimum value of channels usable by the POS terminal 100. The CH_max is a maximum value of the channels usable by the POS terminal 100.

The computer programs stored in the ROM 102 or the auxiliary storage device 104 include a computer program for executing processing explained below. As an example, the POS terminal 100 is transferred to an administrator or the like of the POS terminal 100 in a state in which the computer programs are stored in the ROM 102 or the auxiliary storage device 104. However, the POS terminal 100 may be transferred to the administrator or the like in a state in which the computer programs are not stored in the ROM 102 or the auxiliary storage device 104. The POS terminal 100 may be transferred to the administrator or the like in a state in which computer programs different from the computer programs are stored in the ROM 102 or the auxiliary storage device 104. The computer program for executing the processing explained below may be separately transferred to the administrator or the like and written in the ROM 102 or the auxiliary storage device 104 under operation by the administrator, a serviceperson, or the like. The transfer of the computer program at this time can be realized by, for example, recording the computer program in a removable storage medium such as a magnetic disk, a magneto-optical disk, an optical disk, or a semiconductor memory or downloading the computer program via a network or the like.

The communication interface 105 is an interface for the POS terminal 100 to wirelessly communicating with the peripheral apparatuses and the like. The communication interface 105 includes, for example, an antenna for communication and a circuit for control.

The touch panel 106 is, for example, a touch panel obtained by laminating a display such as a liquid crystal display or an organic EL display and a pointing device by a touch input. The display included in the touch panel 106 functions as a display device that displays a screen for notifying information to an operator of the POS terminal 100. The touch panel 106 functions as an input device that receives touch operation by the operator.

The bus 107 includes a control bus, an address bus, and a data bus and transmits signals exchanged by the sections of the POS terminal 100.

The scanner 110 reads a barcode, a two-dimensional code, or the like displayed on a commodity or the like and outputs a commodity code or the like recorded in the barcode or the two-dimensional code. The scanner 110 may be a type held by a hand and used or may be a type fixed to a register table or the like. As an example, the scanner 110 includes a processor 111, a ROM 112, a RAM 113, a communication interface 114, and a barcode reading section. These sections are connected by a bus 116 or the like.

The processor 111 is equivalent to a central part of a computer that performs processing such as an arithmetic operation and control necessary for the operation of the scanner 110. The processor 111 controls the sections based on computer programs such as system software, application software, firmware, or the like stored in the ROM 112 or the like in order to realize various functions of the scanner 110. A part or all of the computer programs may be incorporated in a circuit of the processor 111. The processor 111 is, for example, a CPU, an MPU, an SoC, a DSP, a GPU, an ASIC, a PLD, or an FPGA. Alternatively, the processor 111 is a combination of a plurality of devices among these devices.

The ROM 112 is equivalent to a main storage device of the computer including the processor 111 as the central part. The ROM 112 is a nonvolatile memory exclusively used for readout of data. The ROM 112 stores the computer programs explained above. The ROM 112 stores data, various setting values, or the like used by the processor 111 in performing various kinds of processing.

The RAM 113 is equivalent to the main storage device of the computer including the processor 111 as the central part. The RAM 113 is a memory used for reading and writing of data. The RAM 113 is used as a so-called work area or the like in which data temporarily used by the processor 111 in performing the various kinds of processing is stored.

The computer programs stored in the ROM 112 include a computer program for executing processing explained below. As an example, the scanner 110 is transferred to an administrator or the like of the scanner 110 in a state in which the computer programs are stored in the ROM 112. However, the scanner 110 may be transferred to the administrator or the like in a state in which the computer programs are not stored in the ROM 112. The scanner 110 may be transferred to the administrator or the like in a state in which computer programs different from the computer programs are stored in the ROM 112. The computer program for executing the processing explained below may be separately transferred to the administrator or the like and written in the ROM 112 under operation by the administrator, a serviceperson, or the like. The transfer of the computer program at this time can be realized by, for example, recording the computer program in a removable storage medium such as a magnetic disk, a magneto-optical disk, an optical disk, or a semiconductor memory or downloading the computer program via a network or the like.

The communication interface 114 is an interface for wirelessly communicating with the POS terminal 100 and the like. The communication interface 114 is capable of performing transmission and reception of data in a specific channel and at a specific transmission rate. The communication interface 114 may be capable of using a plurality of channels. The communication interface 114 may be capable of using a plurality of transmission rates. The communication interface 114 includes, for example, an antenna for communication and a circuit for control.

The barcode reading section 115 reads a barcode, a two-dimensional code, or the like displayed on a commodity or the like.

The bus 116 includes a control bus, an address bus, and a data bus and transmits signals exchanged by the sections of the scanner 110.

The printer 120 performs printing based on data transmitted from the POS terminal 100. The printer 120 prints, for example, a receipt and credit details. The printer 120 is a printer of any one of various types such as a dot-impact printer, an inkjet printer, a thermal printer, a laser printer, or other printer. As an example, the printer 120 includes a processor 121, a ROM 122, a RAM 123, an auxiliary storage device 124, a communication interface 125, and a printing section 126. These sections are connected by a bus 127 or the like.

The processor 121 is equivalent to a central part of a computer that performs processing such as an arithmetic operation and control necessary for the operation of the printer 120. The processor 121 controls the sections based on computer programs such as system software, application software, firmware, or the like stored in the ROM 122, the auxiliary storage device 124, or the like in order to realize various functions of the printer 120. A part or all of the computer programs may be incorporated in a circuit of the processor 121. The processor 121 is, for example, a CPU, an MPU, an SoC, a DSP, a GPU, an ASIC, a PLD, or an FPGA. Alternatively, the processor 121 is a combination of a plurality of devices among these devices.

The ROM 122 is equivalent to a main storage device of the computer including the processor 121 as the central part. The ROM 122 is a nonvolatile memory exclusively used for readout of data. The ROM 122 stores the computer programs explained above. The ROM 122 stores data, various setting values, or the like used by the processor 121 in performing various kinds of processing.

The RAM 123 is equivalent to the main storage device of the computer including the processor 121 as the central part. The RAM 123 is a memory used for reading and writing of data. The RAM 123 is used as a so-called work area or the like in which data temporarily used by the processor 121 in performing the various kinds of processing is stored.

The auxiliary storage device 124 is equivalent to an auxiliary storage device of the computer including the processor 121 as the central part. The auxiliary storage device 124 is, for example, an EEPROM, an HDD, an SSD, or an eMMC. The auxiliary storage device 124 sometimes stores the computer programs explained above. The auxiliary storage device 124 saves data used by the processor 121 in performing the various kinds of processing, data generated by the processing in the processor 121, various setting values, or the like.

The computer programs stored in the ROM 122 or the auxiliary storage device 124 include a computer program for executing processing explained below. As an example, the printer 120 is transferred to an administrator or the like of the printer 120 in a state in which the computer programs are stored in the ROM 122 or the auxiliary storage device 124. However, the printer 120 may be transferred to the administrator or the like in a state in which the computer programs are not stored in the ROM 122 or the auxiliary storage device 124. The printer 120 may be transferred to the administrator or the like in a state in which computer programs different from the computer programs are stored in the ROM 122 or the auxiliary storage device 124. The computer program for executing the processing explained below may be separately transferred to the administrator or the like and written in the ROM 122 or the auxiliary storage device 124 under operation by the administrator, a serviceperson, or the like. The transfer of the computer program at this time can be realized by, for example, recording the computer program in a removable storage medium such as a magnetic disk, a magneto-optical disk, an optical disk, or a semiconductor memory or downloading the computer program via a network or the like.

The communication interface 125 is an interface for the printer 120 to wirelessly communicating with the POS terminal 100 and the like. The communication interface 125 is capable of transmitting and receiving data in a specific channel and at a specific transmission rate. The communication interface 125 may be capable of using a plurality of channels. The communication interface 125 may be capable of using a plurality of transmission rates. The communication interface 125 includes, for example, an antenna for communication and a circuit for control.

The printing section 126 includes a supplying section configured to supply a sheet, a conveying motor configured to convey the sheet, a control section configured to control the conveying motor, and a forming section configured to form an image on the sheet with toner, ink, or the like.

The bus 127 includes a control bus, an address bus, and a data bus and transmits signals exchanged by the sections of the printer 120.

The keyboard 130 receives operation by the operator of the POS terminal 100. As an example, the keyboard 130 includes a processor 131, a ROM 132, a RAM 133, a communication interface 134, and an input section 135. These sections are connected by a bus 136 or the like.

The processor 131 is equivalent to a central part of a computer that performs processing such as an arithmetic operation, control, and the like necessary for the operation of the keyboard 130. The processor 131 controls the sections based on computer programs such as system software, application software, firmware, or the like stored in the ROM 132 or the like in order to realize various functions of the keyboard 130. A part or all of the computer programs may be incorporated in a circuit of the processor 131. The processor 131 is, for example, a CPU, an MPU, an SoC, a DSP, a GPU, an ASIC, a PLD, or an FPGA. Alternatively, the processor 131 is a combination of a plurality of devices among these devices.

The ROM 132 is equivalent to a main storage device of the computer including the processor 131 as the central part. The ROM 132 is a nonvolatile memory exclusively used for readout of data. The ROM 132 stores the computer programs explained above. The ROM 132 stores data, various setting values, or the like used by the processor 131 in performing various kinds of processing.

The RAM 133 is equivalent to the main storage device of the computer including the processor 131 as the central part. The RAM 133 is a memory used for reading and writing of data. The RAM 133 is used as a so-called work area or the like in which data temporarily used by the processor 131 in performing the various kinds of processing is stored.

The computer programs stored in the ROM 132 include a computer program for executing processing explained below. As an example, the keyboard 130 is transferred to an administrator or the like of the keyboard 130 in a state in which the computer programs are stored in the ROM 132. However, the keyboard 130 may be transferred to the administrator or the like in a state in which the computer programs are not stored in the ROM 132. The keyboard 130 may be transferred to the administrator or the like in a state in which computer programs different from the computer programs are stored in the ROM 132. The computer program for executing the processing explained below may be separately transferred to the administrator or the like and written in the ROM 132 under operation by the administrator, a serviceperson, or the like. The transfer of the computer program at this time can be realized by, for example, recording the computer program in a removable storage medium such as a magnetic disk, a magneto-optical disk, an optical disk, or a semiconductor memory or downloading the computer program via a network or the like.

The communication interface 134 is an interface for the keyboard 130 to wirelessly communicating with the POS terminal 100 and the like. The communication interface 134 is capable of transmitting and receiving data in a specific channel and at a specific transmission rate. The communication interface 134 may be capable of using a plurality of channels. The communication interface 134 may be capable of using a plurality of transmission rates. The communication interface 134 includes, for example, an antenna for communication and a circuit for control.

The input section 135 receives operation by the operator. The input section 135 is, for example, a plurality of keys.

The bus 136 includes a control bus, an address bus, and a data bus and transmits signals exchanged by the sections of the keyboard 130.

The reader writer 140 performs communication with a magnetic card (a magnetic stripe card), a contact IC card, a noncontact IC card, or the like. The reader writer 140 performs communication with a noncontact IC chip mounted on an electronic device (e.g., a cellular phone, a smartphone, or a tablet PC (personal computer)). The magnetic card, the contact IC card, the noncontact IC card, the noncontact IC chip, and the like are hereinafter collectively referred to as "IC card and the like". As an example, the reader writer 140 includes a processor 141, a ROM 142, a RAM 143, an auxiliary storage device 144, a communication interface 145, and a reading section 146. These sections are connected by a bus 147 or the like.

The processor 141 is equivalent to a central part of a computer that performs processing such as an arithmetic operation and control necessary for the operation of the reader writer 140. The processor 141 controls the sections based on computer programs such as system software, application software, firmware, or the like stored in the ROM 142, the auxiliary storage device 144, or the like in order to realize various functions of the reader writer 140. A part or all of the computer programs may be incorporated in a circuit of the processor 141. The processor 141 is, for example, a CPU, an MPU, an SoC, a DSP, a GPU, an ASIC, a PLD, or an FPGA. Alternatively, the processor 141 is a combination of a plurality of devices among these devices.

The ROM 142 is equivalent to a main storage device of the computer including the processor 141 as the central part. The ROM 142 is a nonvolatile memory exclusively used for readout of data. The ROM 142 stores the computer programs explained above. The ROM 142 stores data, various setting values, or the like used by the processor 141 in performing various kinds of processing.

The RAM 143 is equivalent to the main storage device of the computer including the processor 141 as the central part. The RAM 143 is a memory used for reading and writing of data. The RAM 143 is used as a so-called work area or the like in which data temporarily used by the processor 141 in performing the various kinds of processing is stored.

The auxiliary storage device 144 is equivalent to an auxiliary storage device of the computer including the processor 141 as the central part. The auxiliary storage device 144 is, for example, an EEPROM, an HDD, an SSD, or an eMMC. The auxiliary storage device 144 sometimes stores the computer programs explained above. The auxiliary storage device 144 saves data used by the processor 141 in performing the various kinds of processing, data generated by the processing in the processor 141, various setting values, or the like.

The computer programs stored in the ROM 142 or the auxiliary storage device 144 include a computer program for executing processing explained below. As an example, the reader writer 140 is transferred to an administrator or the like of the reader writer 140 in a state in which the computer programs are stored in the ROM 142 or the auxiliary storage device 144. However, the reader writer 140 may be transferred to the administrator or the like in a state in which the computer programs are not stored in the ROM 142 or the auxiliary storage device 144. The reader writer 140 may be transferred to the administrator or the like in a state in which computer programs different from the computer programs are stored in the ROM 142 or the auxiliary storage device 144. The computer program for executing the processing explained below may be separately transferred to the administrator or the like and written in the ROM 142 or the auxiliary storage device 144 under operation by the administrator, a serviceperson, or the like. The transfer of the computer program at this time can be realized by, for example, recording the computer program in a removable storage medium such as a magnetic disk, a magneto-optical disk, an optical disk, or a semiconductor memory or downloading the computer program via a network or the like.

The communication interface 145 is an interface for the reader writer 140 to wirelessly communicating with the POS terminal 100 and the like. The communication interface 145 is capable of transmitting and receiving data in a specific channel and at a specific transmission rate. The communication interface 145 may be capable of using a plurality of channels. The communication interface 145 may be capable of using a plurality of transmission rates. The communication interface 145 includes, for example, an antenna for communication and a circuit for control.

The reading section 146 reads information stored in an IC card or the like. The reading section 146 writes information in the IC card or the like.

The bus 147 includes a control bus, an address bus, and a data bus and transmits signals exchanged by the sections of the reader writer 140.

Figure 4:
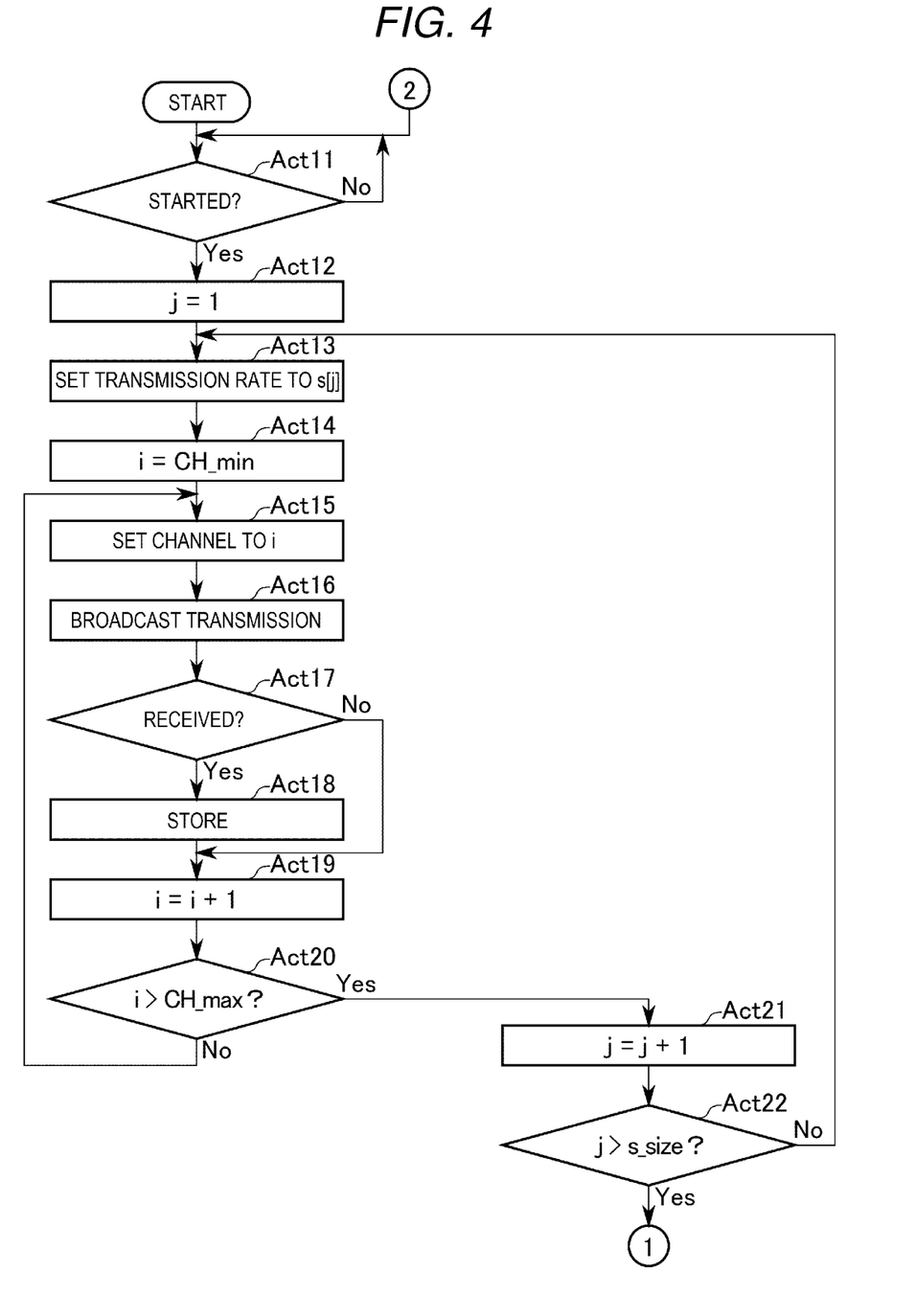
FIG. 4 is a flowchart illustrating an example of processing by a processor of a communication apparatus according to the embodiment.
Figure 5:
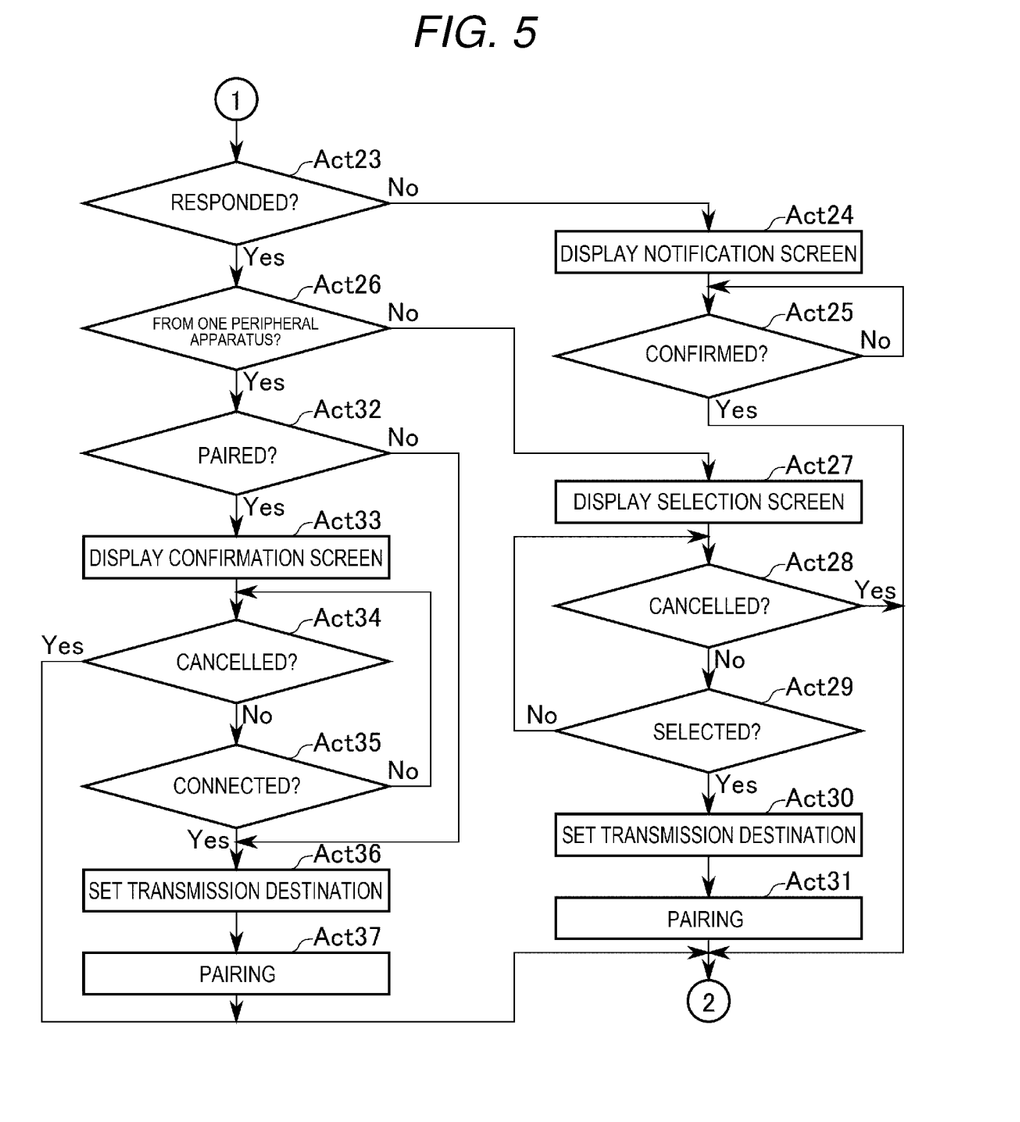
FIG. 5 is a flowchart illustrating the example of the processing by the processor.
Figure 6:
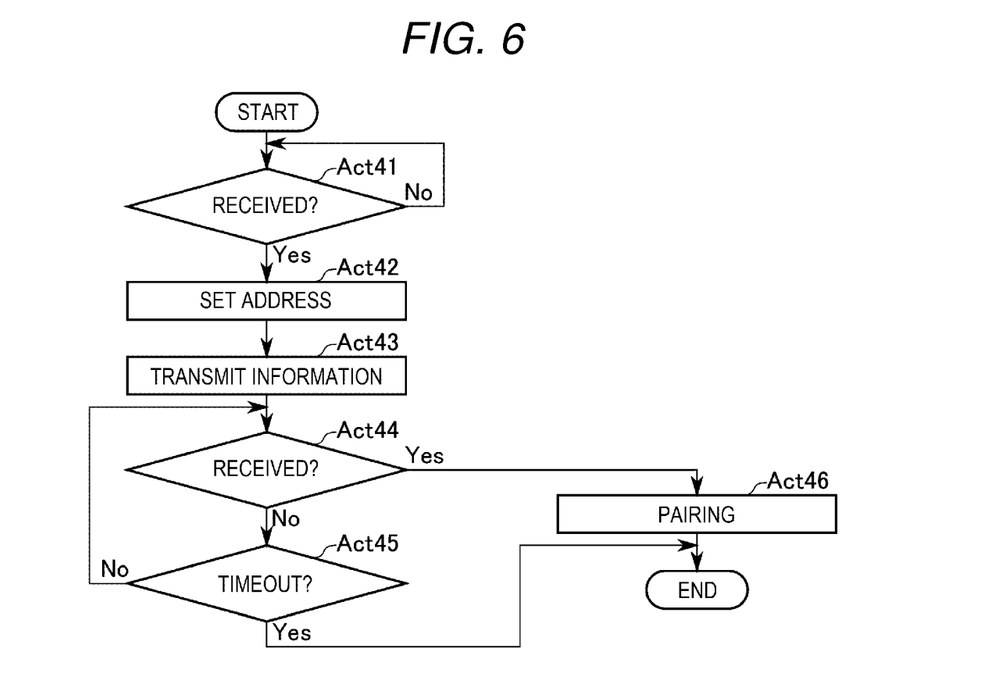
FIG. 6 is a flowchart illustrating an example of processing by a processor of a peripheral apparatus according to the embodiment.

The operation of the communication system 1 according to the embodiment is explained with reference to FIGS. 4 to 6 and the like. Content of processing in the following operation explanation is an example. Various kinds of processing capable of obtaining the same result can be used as appropriate. FIGS. 4 and 5 are flowcharts of processing by the processor 101 of the POS terminal 100. The processor 101 executes the processing based on the computer program stored in, for example, the ROM 102 or the auxiliary storage device 104. FIG. 6 is a flowchart of processing by the processor 111 of the scanner 110, the processor 121 of the printer 120, the processor 131 of the keyboard 130, or the processor 141 of the reader writer 140. The processor 111 executes the processing based on the computer program stored in, for example, the ROM 112. The processor 121 executes the processing based on the computer program stored in, for example, the ROM 122 or the auxiliary storage device 124. The processor 131 executes the processing based on the computer program stored in, for example, the ROM 132. The processor 141 executes the processing based on the computer program stored in, for example, the ROM 142 or the auxiliary storage device 144. The processors of the peripheral apparatuses are hereinafter collectively referred to as "peripheral processor". The communication interfaces of the peripheral apparatuses are hereinafter collectively referred to as "peripheral communication interface". In the following explanation, if the processor 101 or the peripheral processor proceeds to Act (N+1) after processing in Act N (N is a natural number), description for explaining this case is sometimes omitted.

In starting the processing illustrated in FIG. 4, the processor 101 of the POS terminal 100 allocates a variable i, a variable j, and an array s to the RAM 103 and the like. The variable i indicates a channel. The variable j indicates a transmission rate. The arrays indicates a list of transmission rates usable by the POS terminal 100. The transmission rates usable by the POS terminal 100 are stored in elements of the array s.

In Act 11, the processor 101 waits for start operation to be performed. The start operation is operation for instructing the POS terminal 100 to attempt pairing with the peripheral apparatuses present around the POS terminal 100. The operator of the POS terminal 100 performs the start operation, for example, if the operator desires to pair the POS terminal 100 and the peripheral apparatuses present around the POS terminal 100. If the start operation is performed, the processor 101 determines Yes in Act 11 and proceeds to Act 12.

In Act 12, the processor 101 substitutes 1 in the variable j.

In Act 13, the processor 101 sets a transmission rate of wireless communication to s[j]. The s[j] indicates a j-th element of the array s.

In Act 14, the processor 101 substitutes CH_min in the variable i.

In Act 15, the processor 101 sets a channel of the wireless communication to i.

In Act 16, the processor 101 controls the communication interface 105 to perform broadcast transmission of a first command. The communication interface 105 performs the broadcast transmission of the first command based on the control. The first command is a command for requesting peripheral apparatuses, which receive the first command, to transmit replies to the POS terminal 100. The replies include information concerning the peripheral apparatuses, which are transmitters of the replies. The first command includes an address of the POS terminal 100. As an example, the address is an IP (Internet Protocol) address. However, the address may be another address. The first command transmitted at this time is transmitted in the channel set in Act 15. The first command is transmitted at the transmission rate set in Act 13. The broadcast transmission is transmission performed without designating a transmission destination address. Therefore, data transmitted by the broadcast transmission can be received irrespective of an address. The communication interface 105 desirably transmits the first command with power with which only the peripheral apparatuses present around the POS terminal 100 can receive the first command. According to the above explanation, the communication interface 105 is an example of a transmitting section that performs broadcast transmission of a command. Similarly, the communication interface 105 is an example of a first transmitting section.

In the other hand, a peripheral processor not paired with the POS terminal 100 starts the processing illustrated in the flowchart of FIG. 6. Alternatively, the peripheral processor starts the processing illustrated in the flowchart of FIG. 6 based on, for example, operation by an operator of the peripheral apparatus.

In Act 41, the peripheral processor waits for the first command to be received by the peripheral communication interface. The peripheral communication interface is capable of receiving data transmitted in a specific channel and at a specific transmission rate. Therefore, if the POS terminal 100 transmits the first command in the channel and at the transmission rate, the peripheral communication interface receives the first command. If the first command is received, the peripheral processor determines Yes in Act 41 and proceeds to Act 42. According to the above explanation, the peripheral communication interface is an example of a second receiving section that receives a command.

In Act 42, the peripheral processor sets a transmission destination address to an address included in the first command received in Act 41.

In Act 43, the peripheral processor instructs the peripheral communication interface to transmit a second command to the POS terminal 100. In response to the instruction, the peripheral communication interface transmits the second command to the POS terminal 100. The second command is a command for transmitting various kinds of information concerning the peripheral apparatus, which is a transmitter of the second command, to the POS terminal 100. Therefore, the second command includes the various kinds of information. The various kinds of information include, for example, an apparatus ID (identifier), an apparatus type, an address, a channel, a transmission rate, and an RSSI (received signal strength indication) of the peripheral apparatus. The apparatus ID is a unique identification sign given to each of the peripheral apparatuses. The apparatus type indicates a type of an apparatus such as a scanner, a printer, a keyboard, or a reader writer. The channel and the transmission rate included in the various kinds of information are a channel and a transmission rate usable by the peripheral apparatus. The peripheral communication interface transmits the second command in the same channel and at the same transmission rate as a channel and a transmission rate during reception of the second command. The transmitted second command is received by the communication interface 105 of the POS terminal 100. According to the above explanation, the peripheral communication interface is an example of a second transmitting section that transmits various kinds of information necessary for wireless connection to the POS terminal 100.

On the other hand, in Act 17 in FIG. 4, the processor 101 of the POS terminal 100 determines whether the second command is received within a fixed time by the communication interface 105. The communication interface 105 receives data transmitted in the same channel and at the same transmission rate as a channel and a transmission rate during the broadcast transmission in Act 16. If second commands are transmitted from a plurality of peripheral apparatuses, the communication interface 105 receives the plurality of second commands. If the second command is received, the processor 101 determines Yes in Act 17 and proceeds to Act 18. According to the above explanation, the communication interface 105 is an example of a receiving section that receives various kinds of information. Similarly, the communication interface 105 is an example of a first receiving section.

In Act 18, the processor 101 stores, in the RAM 103, the auxiliary storage device 104, or the like, various kinds of information included in the second command received in Act 17. The processor 101 stores the channel and the transmission rate during the reception in association with the various kinds of information. If second commands are received from a plurality of peripheral apparatuses, the processor 101 stores various kinds of information included in each of the received plurality of second commands.

On the other hand, if the second command is not received within the fixed time, the processor 101 determines No in Act 17 and proceeds to Act 19. After the processing in Act 18, the processor 101 proceeds to Act 19.

In Act 19, the processor 101 increases a value of the variable i by 1.

In Act 20, the processor 101 determines whether the value of the variable i is larger than the CH_max. If the value of the variable i is equal to or smaller than the CH_max, the processor 101 determines No in Act 20 and returns to Act 15.

By repeating Act 15 to Act 20 as explained above, the POS terminal 100 performs the broadcast transmission of the first command in the channels of the CH_min to the CH_max while shifting the channel by one channel at a time.

On the other hand, if the value of the variable i is larger than the CH_max, the processor 101 determines Yes in Act 15 and proceeds to Act 21.

In Act 21, the processor 101 increases a value of the variable j by 1.

In Act 22, the processor 101 determines whether the value of the variable j is larger than s_size. The s_size is the number of elements of the array s. If the value of the variable j is equal to or smaller than the s_size, the processor 101 determines No in Act 22 and returns to Act 13. On the other hand, if the value of the variable j is larger than the s_size, the processor 101 determines Yes in Act 22 and proceeds to Act 23 in FIG. 5.

By repeating Act 13 to Act 22 as explained above, the POS terminal 100 performs the broadcast transmission of the first command at each of the transmission rates stored in the elements of the array s. Consequently, the POS terminal 100 performs the broadcast transmission of the first command in the channels of the CH_min to the CH_max at each of the transmission rates stored in the elements of the array s.

In Act 23, the processor 101 determines whether the peripheral apparatuses respond. For example, if the number of the various kinds of information stored in Act 18 is equal to or larger than one, the processor 101 determines that the peripheral apparatuses respond. If determining that the peripheral apparatuses do not respond, the processor 101 determines No in Act 23 and proceeds to Act 24.

In Act 24, the processor 101 generates an image corresponding to a notification screen. The processor 101 instructs the touch panel 106 to display the generated image. In response to the instruction, the touch panel 106 displays the notification screen.

The notification screen is a screen for notifying the operator of the POS terminal 100 that the peripheral apparatuses do not respond. The notification screen includes, for example, a character string indicating that the peripheral apparatuses do not respond and a notification confirmation button. The notification confirmation button is a button operated by the operator if the operator confirms content displayed on the notification screen.

In Act 25, the processor 101 waits for the notification confirmation button to be operated. If the notification confirmation button is operated, the processor 101 determines Yes in Act 25 and returns to Act 11 in FIG. 4.

On the other hand, if peripheral apparatuses respond, the processor 101 determines Yes in Act 23 in FIG. 5 and proceeds to Act 26.

In Act 26, the processor 101 determines whether one peripheral apparatus responds. For example, if the number of the various kinds of information stored in Act 18 is one, the processor 101 determines that one peripheral apparatus responds. If the number of the various kinds of information stored in Act 18 is plural, the processor 101 determines that a plurality of peripheral apparatuses respond. If determining that the plurality of peripheral apparatuses respond, the processor 101 determines No in Act 26 and proceeds to Act 27.

Figure 7:
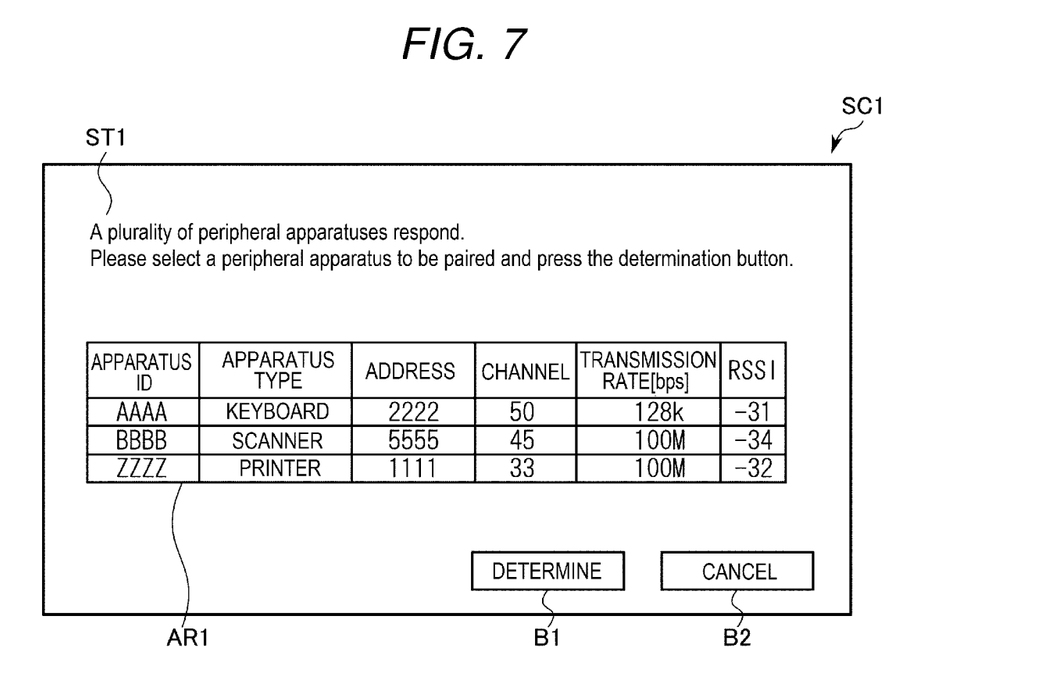
FIG. 7 is a diagram illustrating an example of a selection screen displayed on a touch panel of the communication apparatus.

In Act 27, the processor 101 generates an image corresponding to a selection screen SC1 illustrated in FIG. 7. The processor 101 instructs the touch panel 106 to display the generated image. In response to the instruction, the touch panel 106 displays the selection screen SC1.

FIG. 7 is a diagram illustrating an example of the selection screen SC1 displayed on the touch panel 106. The selection screen SC1 is a screen for selecting a peripheral apparatus to be paired. The selection screen SC1 includes, for example, a character string ST1, a region AR1, a determination button B1, and a cancel button B2.

The character string ST1 includes, for example, a character string indicating that a plurality of peripheral apparatuses respond. As an example, the character string ST1 is "A plurality of apparatuses respond. Please select a peripheral apparatus to be paired and press the determination button".

A list of the responding peripheral apparatuses is displayed in the region AR1. The operator of the POS terminal 100 selects, from the list, a peripheral apparatus that the operator desires to pair with the POS terminal 100. In the list, a selected state and an unselected state can be switched concerning each of the peripheral apparatuses included in the list.

The determination button B1 is a button operated by the operator of the POS terminal 100 if the operator desires to pair the POS terminal 100 and the peripheral apparatus in the selected state.

The cancel button B2 is a button operated by the operator of the POS terminal 100 if the operator does not desire to pair the POS terminal 100 with the responding peripheral apparatus.

In Act 28, the processor 101 determines whether the operation for instructing not to execute pairing with the responding peripheral apparatus is performed. That is, the processor 101 determines whether predetermined operation such as operation of the cancel button B2 is performed. If the operation for instructing not to execute pairing with the responding peripheral apparatus is not performed, the processor 101 determines No in Act 28 and proceeds to Act 29.

In Act 29, the processor 101 determines whether operation for instructing to execute the pairing with the peripheral apparatus in the selected state is performed. That is, the processor 101 determines whether predetermined operation such as operation of the determination button B1 is performed. If the operation for instructing to execute the pairing with the peripheral apparatus in the selected state is not performed, the processor 101 determines No in Act 29 and returns to Act 28. In this way, the processor 101 repeats Act 28 and Act 29 until the operation for instructing not to execute the pairing with the responding peripheral apparatus is performed or the operation for instructing to execute the pairing with the peripheral apparatus in the selected state is performed.

In a waiting state in Act 28 and Act 29, if the operation for instructing not to execute the pairing with the responding peripheral apparatus such as the operation of the cancel button B2 is performed, the processor 101 determines Yes in Act 28 and returns to Act 11.

In the waiting state in Act 28 and Act 29, if the operation for instructing to execute the pairing with the peripheral apparatus in the selected state such as the operation of the determination button B1 is performed, the processor 101 determines Yes in Act 29 and proceeds to Act 30. The operation of the processor 101 in the case in which the operation explained above is performed if all the peripheral apparatuses are not in the selected state is decided by, for example, a designer of the POS terminal 100. For example, the processor 101 neglects the operation if all the peripheral apparatuses included in the region AR1 are not in the selected state. Alternatively, the processor 101 may disable the operation itself if all the peripheral apparatuses included in the region AR1 are not in the selected state.

In Act 30, the processor 101 sets the channel and the transmission rate the same as a channel and a transmission rate of the peripheral apparatus that is in the selected state in Act 29. The processor 101 sets a transmission destination to an address of the peripheral apparatus. The processor 101 determines the channel and the transmission rate set at this time based on, for example, channels included in the various kinds of information stored in Act 18. Alternatively, the processor 101 determines the channel and the transmission rate set at this time based on channels associated with the various kinds of information.

The channels included in the various kinds of information and the channel during the reception are channels usable by the peripheral apparatus. Therefore, the processor 101 operates as an example of a confirming section that, by using, for determination of a channel, the various kinds of information stored in Act 18 or the channels associated with the various kinds of information, confirms in which of the channels the POS terminal 100 is capable of communicating with the peripheral apparatus.

In Act 31, the processor 101 instructs the communication interface 105 to transmit a pairing command to the peripheral apparatus according to the address, the channel, and the transmission rate set in Act 30. The pairing command is a command for requesting a receiver to be paired with a transmitter. In response to the instruction, the communication interface 105 transmits the pairing command to the peripheral apparatus. Consequently, the POS terminal 100 executes pairing with the peripheral apparatus. The transmitted pairing command is received by the peripheral communication interface. If a plurality of peripheral apparatuses are selected on the selection screen SC1, the processor 101 performs the processing in Act 30 and Act 31 on each of the selected peripheral apparatuses. After the processing in Act 30 and Act 31 for each of the peripheral apparatuses, the processor 101 returns to Act 11 in FIG. 4.

On the other hand, in Act 44 in FIG. 6, the peripheral processor of the peripheral apparatus determines whether the pairing command is received by the peripheral communication interface. If the pairing command is not received, the peripheral processor determines No in Act 44 and proceeds to Act 45.

In Act 45, the peripheral processor determines whether timeout occurs. If timeout does not occur, the peripheral processor determines No in Act 45 and returns to Act 44. In this way, the peripheral processor repeats Act 44 and Act 45 until the pairing command is received or timeout occurs.

If the pairing command is received in a waiting state in Act 44 and Act 45, the peripheral processor determines Yes in Act 44 and proceeds to Act 46.

In Act 46, the peripheral processor executes pairing with the POS terminal 100 based on the pairing command received in Act 44. After the processing in Act 46, the peripheral processor ends the processing illustrated in the flowchart of FIG. 6. The pairing is an example of establishment of wireless connection between the POS terminal 100 and the peripheral apparatus.

The POS terminal 100 controls, for example, the paired peripheral apparatus. The POS terminal 100 performs, for example, exchange of data between the POS terminal 100 and the paired peripheral apparatus.

If timeout occurs in the waiting state in Act 44 and Act 45, the peripheral processor determines Yes in Act 45 and ends the processing illustrated in the flowchart of FIG. 6.

If determining that one peripheral apparatus responds, the processor 101 determines Yes in Act 26 in FIG. 5 and proceeds to Act 32.

In Act 32, the processor 101 determines whether a peripheral apparatus of the same type as the responding peripheral apparatus is already paired. If the peripheral apparatus of the same type as the responding peripheral apparatus is already paired, the processor 101 determines Yes in Act 32 and proceeds to Act 33. The same type refers to, for example, an apparatus of the same apparatus type.

Figure 8:
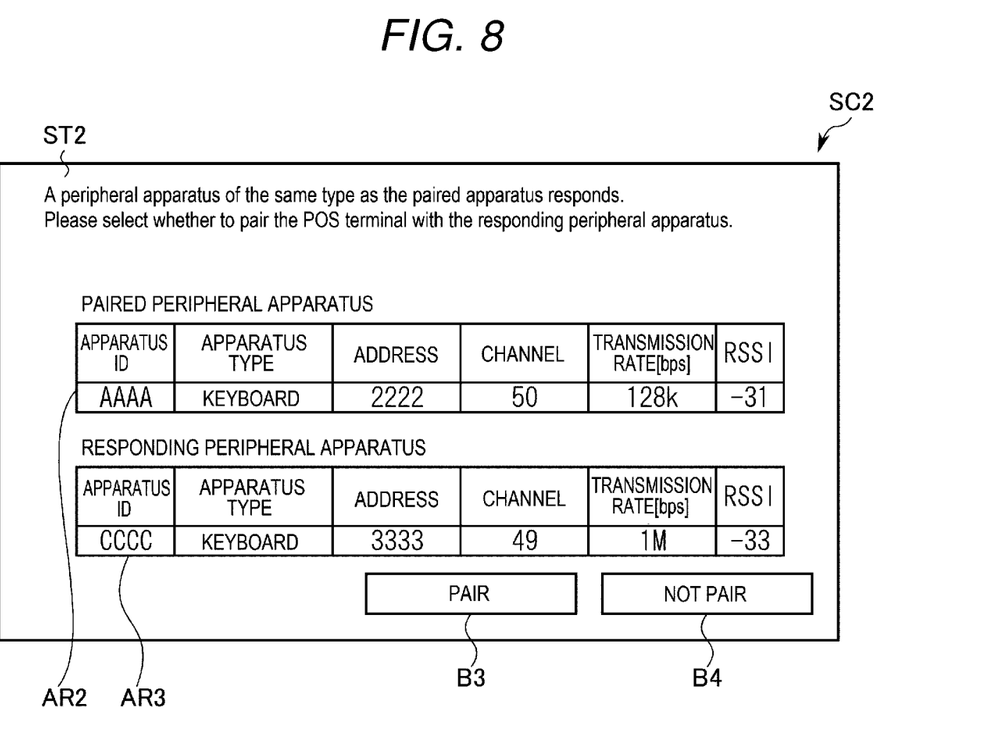
FIG. 8 is a diagram illustrating an example of a confirmation screen displayed on the touch panel.

In Act 33, the processor 101 generates an image corresponding to a confirmation screen SC2 illustrated in FIG. 8. The processor 101 instructs the touch panel 106 to display the generated image. In response to the instruction, the touch panel 106 displays the confirmation screen SC2.

FIG. 8 is a diagram illustrating an example of the confirmation screen SC2 displayed on the touch panel 106. The confirmation screen SC2 is a screen for, if the peripheral apparatus of the same type as the responding peripheral apparatus is already paired, confirming with the operator of the POS terminal 100 whether to execute pairing with the responding peripheral apparatus. The confirmation screen CS2 includes, for example, a character string ST2, a region AR2, a region AR3, a determination button B3, and a cancel button B4.

The character string ST2 includes, for example, a character string indicating that the peripheral apparatus of the same type as the already paired peripheral apparatus responds. As an example, the character string ST2 is "A peripheral apparatus of the same type as the already paired apparatus responds. Please select whether to execute pairing with the responding peripheral apparatus".

In the region AR2, various kinds of information concerning the already paired peripheral apparatus are displayed.

In the region AR3, various kinds of information concerning the responding peripheral apparatus are displayed.

The determination button B3 is a button operated by the operator if the operator desires to pair the POS terminal 100 and the responding peripheral apparatus.

The cancel button B4 is a button operated by the operator if the operator does not desire to pair the POS terminal 100 and the responding peripheral apparatus.

In Act 34, the processor 101 determines whether operation for instructing not to execute the pairing with the responding peripheral apparatus is performed. That is, the processor 101 determines whether predetermined operation such as operation of the cancel button B4 is performed. If the operation for instructing not to execute the pairing with the responding peripheral apparatus is not performed, the processor 101 determines No in Act 34 and proceeds to Act 35.

In Act 35, the processor 101 determines whether the operation for instructing to execute the pairing with the responding peripheral apparatus is performed. That is, the processor 101 determines whether predetermined operation such as operation of the determination button B3 is performed. If the operation for instructing to execute the pairing with the responding peripheral apparatus is not performed, the processor 101 determines No in Act 35 and returns to Act 34. In this way, the processor 101 repeats Act 34 and Act 35 until the operation for instructing not to execute the pairing with the responding peripheral apparatus or the operation for instructing to execute the pairing with the responding peripheral apparatus is performed.

In a waiting state in Act 34 and Act 35, if the operation for instructing not to execute the pairing with the responding peripheral apparatus is performed, the processor 101 determines Yes in Act 34 and returns to Act 11 in FIG. 4.

In the waiting state in Act 34 and Act 35 in FIG. 5, if the operation for instructing to execute the pairing with the responding peripheral apparatus is performed, the processor 101 determines Yes in Act 35 and proceeds to Act 36. If the peripheral apparatus of the same type is not paired yet, the processor 101 determines No in Act 32 and proceeds to Act 36.

In Act 36, the processor 101 sets the channel and the transmission rate the same as a channel and a transmission rate of the responding peripheral apparatus. The processor 101 sets the transmission destination to an address of the peripheral apparatus. The processor 101 determines the channel and the transmission rate set at this time based on, for example, the channels included in the various kinds of information stored in Act 18. Alternatively, the processor 101 determines the channel and the transmission rate set at this time based on the channels and the transmission rates associated with the various kinds of information.

In Act 37, the processor 101 instructs the communication interface 105 to transmit the pairing command to the peripheral apparatus according to the address, the channel, and the transmission rate set in Act 36. In response to the instruction, the communication interface 105 transmits the pairing command to the peripheral apparatus. Consequently, the POS terminal 100 executes the pairing with the peripheral apparatus. The transmitted pairing command is received by the peripheral communication interface. After the processing in Act 37, the processor 101 returns to Act 11 in FIG. 4.

According to the above explanation, the processor 101 performs the processing in Act 31 or Act 37 to cooperate with the communication interface 105 and operate as an example of a communication section that establishes wireless connection to the peripheral apparatus.

As explained above, if one peripheral apparatus responds, the POS terminal 100 is automatically paired with the peripheral apparatus. However, it is excluded if the POS terminal 100 is already paired with a peripheral apparatus of the same type as the responding peripheral apparatus.

With the communication system 1 in the embodiment, the POS terminal 100 performs the broadcast transmission of the first command to the plurality of channels. Consequently, the POS terminal 100 can cause a peripheral apparatus, a channel in use of which is unknown, to receive the first command. Further, with the communication system 1 in the embodiment, the peripheral apparatus that receives the first command transmits a channel and the like to the POS terminal 100 as various kinds of information of the peripheral apparatus. Consequently, the POS terminal 100 is capable of performing pairing by adjusting a channel of communication to the channel of the peripheral apparatus. Therefore, the POS terminal 100 is capable of performing the pairing with the peripheral apparatus even if a channel used by the peripheral apparatus in communication is unknown. Alternatively, by receiving the various kinds of information transmitted from the peripheral apparatus, the POS terminal 100 can learn that a channel used for the transmission of the various kinds of information is the channel used by the peripheral apparatus. Consequently, the POS terminal 100 is capable of performing the pairing with the peripheral apparatus using the channel.

With the communication system 1 in the embodiment, the peripheral apparatus that receives the first command transmits a transmission rate and the like besides the channel as the various kinds of information of the peripheral apparatus. Consequently, the POS terminal 100 is capable of performing the pairing by adjusting a transmission rate to the transmission rate of the peripheral apparatus. Therefore, the POS terminal 100 is capable of performing the pairing with the peripheral apparatus even if a transmission rate used in communication by the peripheral apparatus is unknown.

In a peripheral apparatus not including a UI (user interface) such as a display, it is often hard to learn a channel and a transmission rate in use. Therefore, the communication system 1 in the embodiment is particularly useful if the peripheral apparatus not including the UI is used.

Modifications of the embodiment explained below are also possible.

In the embodiment, the POS terminal is explained as an example of the communication apparatus. However, the communication apparatus may be other apparatuses. For example, the communication apparatus is an image forming apparatus such as an MFP (multifunction peripheral), a copying machine, a printer, or a facsimile. For example, the communication apparatus may be a PC, a server, a smartphone, or an industrial machine. The peripheral apparatus may be an apparatus other than the apparatus explained in the embodiment. Examples of the other peripheral apparatus include a drawer, an automatic change machine, a credit card terminal, a password input machine, a point card terminal, and a display.

In the embodiment, even if one peripheral apparatus responds, the POS terminal 100 does not automatically execute pairing if a peripheral apparatus of the same type is already paired. However, if one peripheral apparatus responds, the POS terminal 100 may automatically execute pairing even if the peripheral apparatus of the same type is already paired. In this case, for example, if determining Yes in Act 26 in FIG. 5, the processor 101 proceeds to Act 36 without performing the processings in Act 32 to Act 35.

In the embodiment, the POS terminal 100 stores the minimum value and the maximum value of the channels. However, the POS terminal 100 may store a list of the channels instead of the minimum value and the maximum value of the channels. In the embodiment, the POS terminal 100 shifts the channel by one channel at a time. However, the channel may be changed by other methods. For example, the POS terminal 100 changes, in order, the channel to the channels included in the list using the list of the channels.

In the embodiment, the POS terminal 100 performs, while changing the transmission rate and the channel, the broadcast transmission of the first command at the respective transmission rates and in the respective channels. However, the POS terminal 100 may change not only the transmission rate and the channel but also other communication parameters. The POS terminal 100 may change three or more kinds of communication parameters. Examples of the communication parameters include a communication scheme and a modulation scheme other than the transmission rate and the channel. According to the above explanation, the POS terminal 100 can be paired with a peripheral apparatus, a communication scheme or a modulation scheme of which is unknown.

The POS terminal 100 may transmit the first command simultaneously in a plurality of channels. The POS terminal 100 may transmit the first command simultaneously at a plurality of transmission rates. The POS terminal 100 may transmit the first command simultaneously with a plurality of communication parameters.

The processor 101 or the peripheral processor may realize, with a hardware configuration of a circuit, a part or all of the processing realized by the computer programs in the embodiment.

While certain embodiments have been described, however, the embodiments are presented as examples and are not intended to limit the scope of the invention. These new embodiments can be implemented in other various forms. Various omissions, substitutions, and changes can be made without departing from the gist of the invention. These embodiments and modifications of the embodiments are included in the scope and the gist of the invention and included in the inventions described in claims and the scope of equivalents of the inventions.

What is claimed is:

1. A communication apparatus, comprising:
   a transmitter configured to broadcast transmissions of a command in a plurality of different channels in response to receiving an instruction to attempt pairing with a peripheral apparatus, wherein the command comprises an address of the communication apparatus;
   a receiver configured to receive information necessary for establishment of a wireless connection, the information being transmitted by the peripheral apparatus that receives the command, wherein the command is transmitted with power with which only the peripheral apparatus can receive;
   a controller configured to confirm, based on the reception of the information by the receiver, which channel of the plurality of different channels that the communication apparatus is capable of communicating with the peripheral apparatus; and
   an interface configured to establish the wireless connection to the peripheral apparatus using the channel confirmed by the controller at a transmission rate set by the controller.

2. The apparatus according to claim 1, further comprising:
   a control section configured to control, according to determination that the information is received from only a singularity of the peripheral apparatus, the interface to establish the wireless connection.

3. The apparatus according to claim 1, wherein
   the transmitter is further configured to broadcast transmissions of the command in the plurality of different channels and with at least one of a plurality of different communication parameters, the controller confirms, based on the reception of the information by the receiver, with which of the communication parameters the communication apparatus is capable of communicating with the peripheral apparatus,
   the interface establishes the wireless connection to the peripheral apparatus using the channel and the communication parameter confirmed by the controller, and
   the communication parameters are communication parameters other than the channel.

4. The apparatus according to claim 3, wherein
   the at least one of a plurality of different communication parameters comprises transmission rate.

5. The apparatus according to claim 1, wherein
   the information comprises at least one of IP address, apparatus ID, apparatus type, and RSSI.

6. The apparatus according to claim 1, wherein
   the communication apparatus is a POS terminal.

7. A peripheral apparatus that configures a communication system in conjunction with a communication apparatus in response to a request to pair the peripheral apparatus with the communication apparatus, comprising:
   a receiver configured to receive a command broadcast by the communication apparatus in a plurality of different channels, wherein the command broadcast comprises an address of the communication apparatus; and
   a transmitter configured to transmit, according to the reception of command, information necessary for establishment of a wireless connection to the communication apparatus, wherein the information comprises a channel of plurality of different channels and a transmission rate.

8. The apparatus according to claim 7, further comprising:
   a control section configured to control, according to determination that the information is transmitted from only a singularity of the peripheral apparatus, establishment the wireless connection.

9. The apparatus according to claim 7, wherein
   the receiver is further configured to receive a command broadcast by the communication apparatus in a plurality of different channels and with at least one of a plurality of different communication parameters,
   the transmitter is further configured to transmit, according to the reception of the command, information necessary for establishment of a wireless connection to the communication apparatus, with which of the communication parameters the communication apparatus is capable of communicating with the peripheral apparatus, and
   the communication parameters are communication parameters other than the channel.

10. The apparatus according to claim 9, wherein
    the at least one of a plurality of different communication parameters comprises transmission rate.

11. The apparatus according to claim 7, wherein
    the information comprises at least one of IP address, apparatus ID, apparatus type, and RSSI.

12. The apparatus according to claim 7, wherein
    the peripheral apparatus is one of a scanner, printer, keyboard, and a reader writer.

13. A communication system, comprising:
    a communication apparatus and a peripheral apparatus, wherein
    the communication apparatus comprises a first transmitter configured to broadcast transmissions of a command in a plurality of different channels in response to receiving an instruction to attempt pairing with the peripheral apparatus, wherein the command comprises an address of the communication apparatus, and wherein the command is transmitted with power with which only the peripheral apparatus can receive,
    the peripheral apparatus comprises:
    a second receiver configured to receive the command; and
    a second transmitter configured to transmit, according to the reception of the command, information necessary for establishment of a wireless connection to the communication apparatus, and
    the communication apparatus further comprises:
    a first receiver configured to receive the information;

a controller configured to confirm, based on the reception of the information by the first receiver, which channel of the plurality of different channels that the communication apparatus is capable of communicating with the peripheral apparatus; and an interface configured to establish the wireless connection to the peripheral apparatus using the channel confirmed by the controller at a transmission rate set by the controller.

14. The system according to claim 13, the communication apparatus further comprising:

a control section configured to control, according to determination that the information is received from only a singularity of the peripheral apparatus, the interface to establish the wireless connection.

15. The system according to claim 13, wherein the first transmitter is further configured to broadcast transmissions of the command in the plurality of different channels and with at least one of a plurality of different communication parameters, the controller confirms, based on the reception of the information by the first receiver, with which of the communication parameters the communication apparatus is capable of communicating with the peripheral apparatus, the interface establishes the wireless connection to the peripheral apparatus using the channel and the communication parameter confirmed by the controller, and the communication parameters are communication parameters other than the channel.

16. The system according to claim 15, wherein
the at least one of a plurality of different communication parameters comprises transmission rate.

17. The system according to claim 13, wherein
the information comprises at least one of IP address, apparatus ID, apparatus type, and RSSI.

18. The system according to claim 13, wherein
the communication apparatus is a POS terminal.

19. The system according to claim 13, wherein
the peripheral apparatus is one of a scanner, printer, keyboard, and a reader writer.

20. The system according to claim 13, wherein
the communication system is a POS system.

* * * * *